(12) United States Patent
Huang et al.

(10) Patent No.: US 9,973,687 B2
(45) Date of Patent: May 15, 2018

(54) CAPTURING APPARATUS AND METHOD FOR CAPTURING IMAGES WITHOUT MOIRE PATTERN

(71) Applicant: Chiun Mai Communication Systems, Inc., New Taipei (TW)

(72) Inventors: Chuan-Yin Huang, New Taipei (TW); Yueh-Chi Wang, New Taipei (TW); Ya-Chi Chuang, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days. days.

(21) Appl. No.: 15/394,834

(22) Filed: Dec. 30, 2016

(65) Prior Publication Data

US 2017/0359508 A1    Dec. 14, 2017

(30) Foreign Application Priority Data

Jun. 8, 2016  (CN) .......................... 2016 1 0403951

(51) Int. Cl.
*H04N 5/232* (2006.01)
*G06K 9/46* (2006.01)
*G06K 9/62* (2006.01)
*H04N 1/40* (2006.01)

(52) U.S. Cl.
CPC ....... *H04N 5/23216* (2013.01); *G06K 9/4642* (2013.01); *G06K 9/6202* (2013.01); *H04N 1/40012* (2013.01); *H04N 5/23212* (2013.01)

(58) Field of Classification Search
CPC .......... H04N 5/23216; H04N 1/40012; H04N 5/23212; H04N 5/21; H04N 5/911; G06K 9/4642; G06K 9/6202
See application file for complete search history.

(56) References Cited

U.S. PATENT DOCUMENTS

| | | | | |
|---|---|---|---|---|
| 6,831,995 B1 * | 12/2004 | Asano | .................... | G09G 3/006 345/698 |
| 7,280,121 B2 * | 10/2007 | Nakahashi | ............ | G06T 15/503 345/611 |
| 8,164,675 B2 * | 4/2012 | Cho | .................... | H04N 5/23248 348/340 |
| 8,947,521 B1 * | 2/2015 | Hill | .................... | G01N 21/9501 348/295 |
| 9,297,769 B1 * | 3/2016 | Hill | .................... | G01N 21/9501 |
| 2009/0185755 A1 * | 7/2009 | Cho | .................... | H04N 5/23248 382/264 |
| 2016/0381336 A1 * | 12/2016 | Akahane | .................. | H04N 5/21 348/239 |

FOREIGN PATENT DOCUMENTS

CN            104486534 A      4/2015

* cited by examiner

*Primary Examiner* — Nicholas G Giles
(74) *Attorney, Agent, or Firm* — ScienBiziP, P.C.

(57) ABSTRACT

An method for capturing images using a capturing apparatus including determining whether a moiré pattern exists in a preview image captured by a camera device. A capturing parameter of the camera device is adjusted when the moiré pattern exists in the preview image. The camera device is controlled to capture images when the capturing parameter has been adjusted.

20 Claims, 3 Drawing Sheets

CAPTURING APPARATUS AND METHOD FOR CAPTURING IMAGES WITHOUT MOIRE PATTERN

CROSS-REFERENCE TO RELATED APPLICATIONS

This application claims priority to Chinese Patent Application No. 201610403951.2 filed on Jun. 8, 2016, the contents of which are incorporated by reference herein.

FIELD

The subject matter herein generally relates to image processing technology, and particularly to a capturing apparatus and a method for capturing images using the capturing apparatus.

BACKGROUND

Capturing apparatus, such as mobile phones, are equipped with a camera device. When the capturing apparatus is used to capture images of a display screen of a television or a computer, imperfections appear in the pictures in the form of: a moiré pattern, other artifacts, darkening, or other unnecessary lines. These imperfections in the picture make are undesirable and in some cases make the picture unusable.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
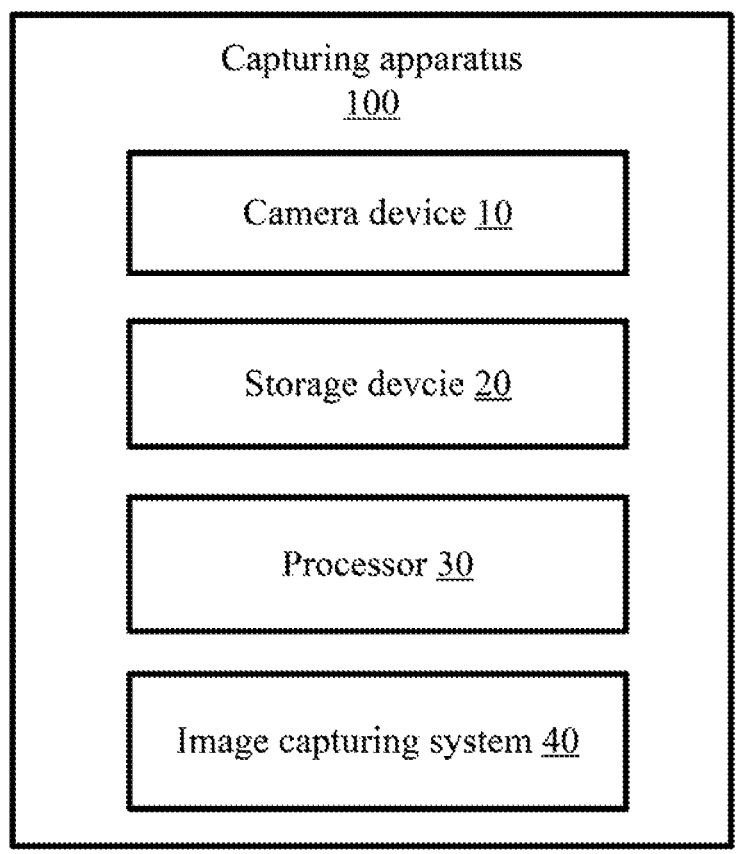
FIG. 1 is a diagram of an exemplary embodiment of a capturing apparatus.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. It should be noted that references to "an" or "one" exemplary embodiment in this disclosure are not necessarily to the same exemplary embodiment, and such references mean "at least one."

Furthermore, the term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives.

FIG. 1 is a diagram of an exemplary embodiment of a capturing apparatus 100. Depending on the exemplary embodiment, the capturing apparatus 100 can include, but is not limited to, a camera device 10, a storage device 20, at least one processor 30, and an image capturing system 40. The camera device 10, the storage device 20, and the at least one processor 30 can communicate with each other through a system bus. In at least one exemplary embodiment, the capturing apparatus 100 can be a mobile phone, a tablet computer, a personal digital assistant, or any other suitable device configured with a camera device. FIG. 1 illustrates only one example of the capturing apparatus 100 that can include more or fewer components than illustrated, or have a different configuration of the various components in other exemplary embodiments.

In at least one exemplary embodiment, the camera device 11 can be used to capture images. The camera device 11 can include, but is not limited to, a camera device lens, a shutter, an aperture, and image sensors.

In at least one exemplary embodiment, the storage device 20 can be an internal storage device such as a memory of the capturing apparatus 100. In other exemplary embodiments, the storage device 20 can be external storage device of the capturing apparatus 100, for example, the storage device 20 can be a secure digital card, or a smart media card. In at least one exemplary embodiment, the storage device 20 can pre-store a plurality of photographic modes. The photographic modes apply to different scenes. For example, the plurality of photographic modes can include, but are not limited to, a display screen mode, a landscape mode, a night mode, a character mode, a macro mode, and a motion mode. The display screen mode can be defined as a mode that the capturing apparatus 100 used to capture images of a working television, a mobile phone, and/or an outdoor lighting emitting diode (LED) display.

The at least one processor 30 can be a central processing unit (CPU), a microprocessor, or other data processing chip that performs functions of the capturing apparatus 100.

Figure 2:
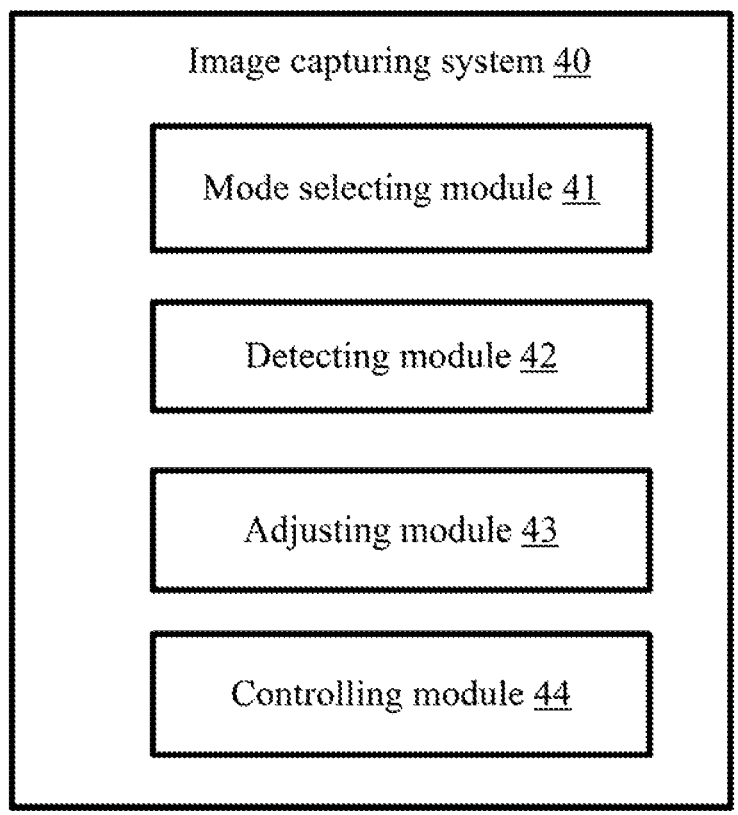
FIG. 2 is a block diagram of an exemplary embodiment of modules of an image capturing system of the capturing apparatus of FIG. 1.

FIG. 2 is a block diagram of an exemplary embodiment of modules of a image capturing system of the capturing apparatus 100. In at least one exemplary embodiment, the image capturing system 40 can include a mode selecting module 41, a detecting module 42, an adjusting module 43, and a controlling module 44. The modules 41-44 include computer instructions or codes in the form of one or more programs that may be stored in the storage device 20 and executed by the at least one processor 30.

In at least one exemplary embodiment, when the camera device 10 is activated, the mode selecting module 41 can control the capturing apparatus 100 to enter a photographic mode in response to a user operation. In at least one exemplary embodiment, when a user selects one of the plurality of photographic modes by pressing/touching a mode selection button of the capturing apparatus 100, the mode selecting module 41 responds by applying the selected photographic mode to the capturing apparatus 100.

In at least one exemplary embodiment, the mode selection button can be a physical button of the capturing apparatus 100 or a visual button displayed on a touch screen of the capturing apparatus 100.

In other exemplary embodiments, the mode selecting module 41 can determine a photographic mode according to a subject being captured by the camera device 10, and automatically apply the determined photographic mode to the capturing apparatus 100.

Generally, when the camera device 10 captures a digital image of an object, if the object includes dense lines, a moiré pattern may appear in the digital image in form of water waves overlaying the object with abnormal color. The moiré pattern is a significant problem in digital images field.

In at least one exemplary embodiment, when the capturing apparatus 100 enters the photographic mode, the detecting module 42 can determine whether the moiré pattern exists in a preview image captured by the camera device 10. In at least one exemplary embodiment, the storage device 20 can pre-store one or template images. Each of the one or more template images includes the moiré pattern. Different template images have different kinds of moiré patterns. In at least one exemplary embodiment, the one or more template images are black-and-white images.

In at least one exemplary embodiment, the detecting module 42 can determine whether the moiré pattern exists in the preview image by obtaining the preview image from the camera device 10 and converting the preview image into a black-and-white image. The detecting module 42 can compare the converted black-and-white picture with the one or more template images. When a similarity between the converted black-and-white picture and one of the one or more template images is equal to or greater than a first predetermined value (e.g., 90%), the detecting module 42 can determine that the moiré pattern exists in the preview image. When the similarity between the converted black-and-white picture and the one of the one or more template images is less than the first predetermined value, the detecting module 42 can determine that the preview image does not have the moiré pattern or only part of the preview image has the moiré pattern.

In other exemplary embodiments, when the similarity between the converted black-and-white picture and the one of the one or more template images is less than the first predetermined value but is greater than a second predetermined value (e.g., 50%), the detecting module 42 can determine that part of the preview image has the moiré pattern. When the similarity between the converted black-and-white picture and the one of the one or more template images is less than the second predetermined value, the detecting module 42 can determine that the moiré pattern does not exist in the preview image.

In other exemplary embodiments, when part of the preview image has the moiré pattern, the detecting module 42 can convert the preview image into a black-and-white image, and then divide the black-and-white image into several portions. The detecting module 42 can compare each portion of the black-and-white image with the one or more template images. When a similarity between one portion of the black-and-white image and one of the one or more template images is equal to or larger than the first predetermined value, the detecting module 42 can determine that the moiré pattern exists in the one portion of the black-and-white image.

In at least one exemplary embodiment, when the detecting module 42 determines that the preview image does not have the moiré pattern, the controlling module 44 can control the camera device 10 to capture images.

When the detecting module 42 determines that the preview image has the moiré pattern, the adjusting module 43 can adjust a capturing parameter of the camera device 10 to remove/or decrease the moiré pattern. In at least one exemplary embodiment, the capturing parameter of the camera device 10 may be a combination of an aperture and a shutter speed of the camera device 10. Alternatively, the capturing parameter of the camera device 10 may be a focusing distance of the camera device 10. Alternatively, the capturing parameter of the camera device 10 may be a combination of an aperture, a shutter speed and a focusing distance of the camera device 10.

In at least one exemplary embodiment, when adjusting the capturing parameters of the camera device 10, the adjusting module 43 can determine an exposure value of the camera device 10 according to a current combination of an aperture and a shutter speed of the camera device 10. The adjusting module 43 can determine a first combination of the aperture and shutter speed according to the exposure value. The adjusting module 43 can change the current combination of the aperture and shutter speed of the camera device 10 to be the first combination of the aperture and shutter speed. In at least one exemplary embodiment, the current combination of the aperture and shutter speed and the first combination of the aperture and shutter speed have the same exposure value.

When the first combination of the aperture and shutter speed is applied to the capturing apparatus 100, and the detecting module 42 can continue to determine whether the moiré pattern exists in a current preview image captured by the camera device 10. Similarly, when the detecting module 42 determines that the moiré pattern exits in the current preview image, the adjusting module 43 can change the first combination of aperture and shutter speed to be a second combination of the aperture and shutter speed according to the exposure value. The first combination of the aperture and shutter speed and the second combination of the aperture and shutter speed have the same exposure value. In other words, the adjusting module 43 can change the combination of the aperture and shutter speed of the camera device 10 until the preview picture of the camera device 10 is qualified, i.e., the preview picture does not have the moiré pattern or only part of the preview picture has the moiré pattern.

In at least one exemplary embodiment, the adjusting module 43 can adjust the aperture of the camera device 10 to be a predetermined aperture. In at least one exemplary embodiment, the predetermined aperture can be a maximum aperture value of the camera device 10. A sharpness of an image captured by the capturing apparatus 100 can be decreased by increasing the aperture of the camera device 10.

In at least one exemplary embodiment, when the adjusting module 43 cannot remove/decrease the moiré pattern by changing the combination of the aperture and shutter speed of the camera device 10, the adjusting module 43 can adjust a focusing distance of the camera device 10 by moving a focusing position of the camera device 10 forward or backward within a predetermined range, such that the moiré pattern of the preview image can be removed or decreased. In at least one exemplary embodiment, the predetermined range is within an image depth when the preview image captured by the camera device 10 is clear. For example, the adjusting module 43 can move the focusing position of the camera device 10 forward or backward by about 3 centimeters.

In at least one exemplary embodiment, the adjusting module 43 can use present technology to determine whether the preview image captured by the camera device 10 is clear. For example, the adjusting module 43 can use a sobel algorithm to determine whether the preview image is clear in temporal-spatial domain, or can use a FFT algorithm to determine whether the preview image is clear in frequency domain.

In at least one exemplary embodiment, the adjusting module 43 can remove/decrease the moiré pattern of the preview image captured by the camera device 10 by directly moving the focusing position forward or backward within the predetermined range, and not changing the combination of aperture and shutter speed of the camera device 10.

In at least one exemplary embodiment, the controlling module 44 can control the camera device 10 to capture images after the adjusting module 43 has adjusted the aperture, the shutter speed, and/or the focusing distance of the camera device 10.

Figure 3:
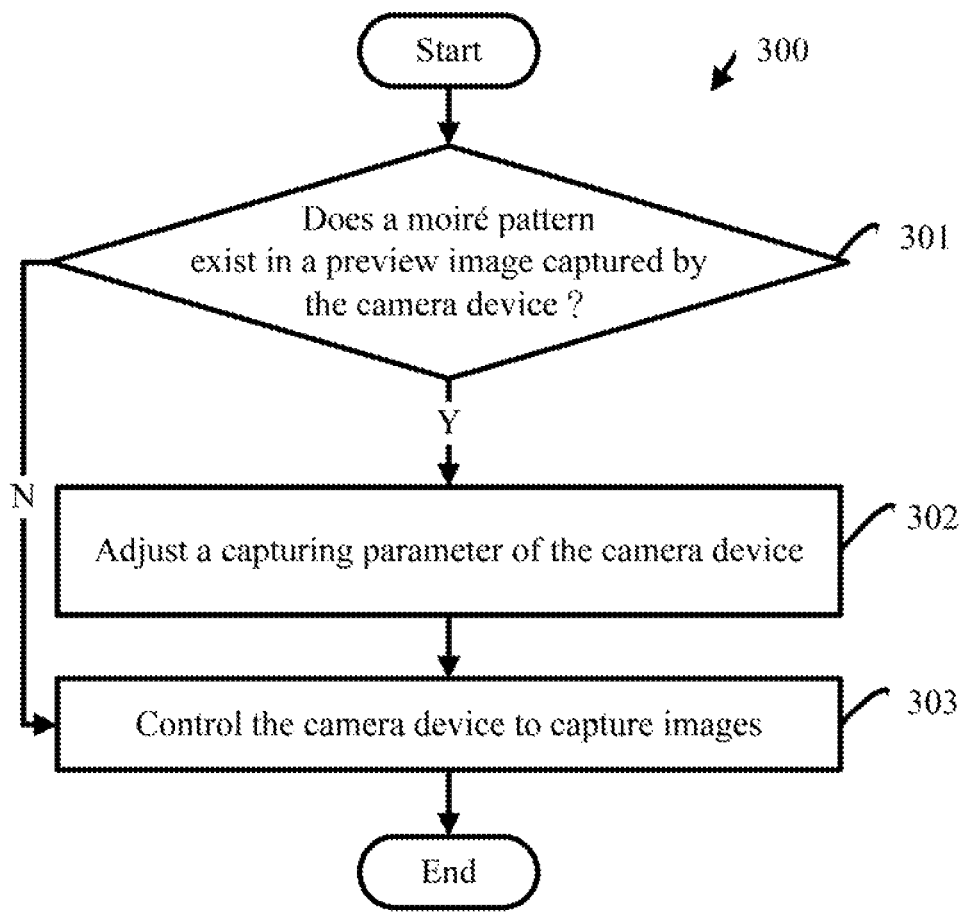
FIG. 3 is a flowchart of an exemplary embodiment of a method for capturing images using the capturing apparatus of FIG. 1.

FIG. 3 illustrates an exemplary embodiment of a flowchart. The example method 300 is provided by way of example, as there are a variety of ways to carry out the method. The method 300 described below can be carried out using the configurations illustrated in FIG. 1, for example, and various elements of these figures are referenced in explaining example method 300. Each block shown in FIG. 3 represents one or more processes, methods, or subroutines, carried out in the example method 300. Additionally, the illustrated order of blocks is by example only and the order of the blocks can be changed according to the present disclosure. The example method 300 can begin at block 31. Depending on the exemplary embodiment, additional steps can be added, others removed, and the ordering of the steps can be changed.

At block 301, when the camera device 10 is activated, the mode selecting module 41 can control the capturing apparatus 100 to enter a photographic mode in response to a user operation. In at least one exemplary embodiment, when a user selects one of the plurality of photographic modes by pressing/touching a mode selection button of the capturing apparatus 100, the mode selecting module 41 responds by applying the selected photographic mode to the capturing apparatus 100.

In at least one exemplary embodiment, the mode selection button can be a physical button of the capturing apparatus 100 or a visual button displayed on a touch screen of the capturing apparatus 100.

In other exemplary embodiments, the mode selecting module 41 can determine a photographic mode according to a subject being captured by the camera device 10, and automatically apply the determined photographic mode to the capturing apparatus 100.

Generally, when the camera device 10 captures a digital image of an object, if the object includes dense lines, a moiré pattern may appear in the digital image in form of water waves overlaying the object with abnormal color. The moiré pattern is a significant problem in digital images field.

In at least one exemplary embodiment, when the capturing apparatus 100 enters the photographic mode, the detecting module 42 can determine whether the moiré pattern exists in a preview image captured by the camera device 10. When the moiré pattern exists in the preview image captured by the camera device 10, the process goes to block S302. When the moiré pattern does not exist in the preview image captured by the camera device 10, the process goes to block S303.

In at least one exemplary embodiment, the storage device 20 can pre-store one or template images. Each of the one or more template images includes the moiré pattern. Different template images have different kinds of moiré patterns. In at least one exemplary embodiment, the one or more template images are black-and-white images.

In at least one exemplary embodiment, the detecting module 42 can determine whether the moiré pattern exists in the preview image by obtaining the preview image from the camera device 10 and converting the preview image into a black-and-white image. The detecting module 42 can compare the converted black-and-white picture with the one or more template images. When a similarity between the converted black-and-white picture and one of the one or more template images is equal to or greater than a first predetermined value (e.g., 90%), the detecting module 42 can determine that the moiré pattern exists in the preview image. When the similarity between the converted black-and-white picture and the one of the one or more template images is less than the first predetermined value, the detecting module 42 can determine that the preview image does not have the moiré pattern or only part of the preview image has the moiré pattern.

In other exemplary embodiments, when the similarity between the converted black-and-white picture and the one of the one or more template images is less than the first predetermined value but is greater than a second predetermined value (e.g., 50%), the detecting module 42 can determine that part of the preview image has the moiré pattern. When the similarity between the converted black-and-white picture and the one of the one or more template images is less than the second predetermined value, the detecting module 42 can determine that the moiré pattern does not exist in the preview image.

In other exemplary embodiments, when part of the preview image has the moiré pattern, the detecting module 42 can convert the preview image into a black-and-white image, and then divide the black-and-white image into several portions. The detecting module 42 can compare each portion of the black-and-white image with the one or more template images. When a similarity between one portion of the black-and-white image and one of the one or more template images is equal to or larger than the first predetermined value, the detecting module 42 can determine that the moiré pattern exists in the one portion of the black-and-white image.

At block S302, when the detecting module 42 determines that the preview image has the moiré pattern, the adjusting module 43 can adjust a capturing parameter of the camera device 10 to remove/or decrease the moiré pattern. In at least one exemplary embodiment, the capturing parameter of the camera device 10 may be a combination of an aperture and a shutter speed of the camera device 10. Alternatively, the capturing parameter of the camera device 10 may be a focusing distance of the camera device 10. Alternatively, the capturing parameter of the camera device 10 may be a combination of an aperture, a shutter speed and a focusing distance of the camera device 10.

In at least one exemplary embodiment, when adjusting the capturing parameters of the camera device 10, the adjusting module 43 can determine an exposure value according to a current combination of an aperture and a shutter speed of the camera device 10. The adjusting module 43 can determine a first combination of the aperture and shutter speed according to the exposure value. The adjusting module 43 can change the current combination of the aperture and shutter speed of the camera device 10 to be the first combination of the aperture and shutter speed. In at least one exemplary embodiment, the current combination of the aperture and shutter speed and the first combination of the aperture and shutter speed have the same exposure value.

When the first combination of the aperture and shutter speed is applied to the capturing apparatus 100, and the detecting module 42 can continue to determine whether the moiré pattern exists in a current preview image captured by the camera device 10. Similarly, when the detecting module 42 determines that the moiré pattern exits in the current preview image, the adjusting module 43 can change the first combination of aperture and shutter speed to be a second combination of the aperture and shutter speed according to the exposure value. The first combination of the aperture and shutter speed and the second combination of the aperture and shutter speed have the same exposure value. In other words, the adjusting module 43 can change the combination of the aperture and shutter speed of the camera device 10 until the preview picture of the camera device 10 is qualified, i.e., the preview picture does not have the moiré pattern or only part of the preview picture has the moiré pattern.

In at least one exemplary embodiment, the adjusting module 43 can adjust the aperture of the camera device 10 to be a predetermined aperture. In at least one exemplary embodiment, the predetermined aperture can be a maximum aperture value of the camera device 10. A sharpness of an image captured by the capturing apparatus 100 can be decreased by increasing the aperture of the camera device 10.

In at least one exemplary embodiment, when the adjusting module 43 cannot remove/decrease the moiré pattern by changing the combination of the aperture and shutter speed of the camera device 10, the adjusting module 43 can adjust a focusing distance of the camera device 10 by moving a focusing position of the camera device 10 forward or backward within a predetermined range, such that the moiré pattern of the preview image can be removed or decreased. In at least one exemplary embodiment, the predetermined range is within an image depth when the preview image captured by the camera device 10 is clear. For example, the adjusting module 43 can move the focusing position of the camera device 10 forward or backward by about 3 centimeters.

In at least one exemplary embodiment, the adjusting module 43 can use present technology to determine whether the preview image captured by the camera device 10 is clear. For example, the adjusting module 43 can use a sobel algorithm to determine whether the preview image is clear in temporal-spatial domain, or can use a FFT algorithm to determine whether the preview image is clear in frequency domain.

In at least one exemplary embodiment, the adjusting module 43 can remove/decrease the moiré pattern of the preview image captured by the camera device 10 by directly moving the focusing position forward or backward within the predetermined range, and not changing the combination of aperture and shutter speed of the camera device 10.

At block S303, the controlling module 44 can control the camera device 10 to capture images.

In other exemplary embodiments, a mode selecting module 41, a detecting module 42, an adjusting module 43, and a controlling module 44 of the image capturing system 40 can be hardware or firmware.

It should be emphasized that the above-described exemplary embodiments of the present disclosure, including any particular exemplary embodiments, are merely possible examples of implementations, set forth for a clear understanding of the principles of the disclosure. Many variations and modifications can be made to the above-described exemplary embodiment(s) of the disclosure without departing substantially from the spirit and principles of the disclosure. All such modifications and variations are intended to be included herein within the scope of this disclosure and protected by the following claims.

What is claimed is:

1. An image capturing method applied to a capturing apparatus that comprises a camera device, the method comprising:
   obtaining a preview image from the camera device;
   comparing the preview image with one or more pre-stored template images;
   determining that a moiré pattern exists in the preview image when a similarity between the preview image and one of the one or more pre-stored template images is equal to or greater than a predetermined value;
   adjusting a capturing parameter of the camera device when the moiré pattern exists in the preview image; and
   controlling the camera device to capture images when the capturing parameter has been adjusted.

2. The method according to claim 1, further comprising:
   converting the preview image into a black-and-white image;
   comparing the converted black-and-white image with the one or more pre-stored template images, wherein each of the one or more pre-stored template images has the moiré pattern; and
   determining that the moiré pattern exists in the preview image when a similarity between the converted black-and-white image and one of the one or more template images is equal to or greater than the predetermined value.

3. The method according to claim 2, further comprising:
   dividing the black-and-white image into a plurality of parts when the preview image is determined to be including the moiré pattern;
   comparing each part of the plurality of parts with the one or more template images;
   determining the moiré pattern exists in one of the plurality of parts when a similarity between the one of the plurality of parts and one of the one or more template images is equal to or greater than the predetermined value.

4. The method according to claim 1, wherein the capturing parameter is a combination of an aperture and a shutter speed of the camera device and/or a focusing distance of the capturing apparatus.

5. The method according to claim 4, wherein an exposure value of the camera device before adjusting the aperture and shutter speed of the camera device is same as the exposure value of the camera device when the aperture and shutter speed of the camera device have been adjusted.

6. The method according to claim 5, wherein the aperture of the camera device is adjusted to be a maximum aperture value of the camera device.

7. The method according to claim 4, further comprising:
   adjusting the focusing distance of the camera device by moving a focusing position of the camera device forward or backward with a predetermined value.

8. A capturing apparatus comprising:
   a camera device;
   a storage device; and at least one processor, wherein the storage device stores one or more programs that, when executed by the at least one processor, cause the at least one processor to:
obtain a preview image from the camera device;
compare the preview image with one or more pre-stored template images;
determine that a moiré pattern exists in the preview image when a similarity between the preview image and one of the one or more pre-stored template images is equal to or greater than a predetermined value;
adjust a capturing parameter of the camera device when the moiré pattern exists in the preview image; and
control the camera device to capture images when the capturing parameter has been adjusted.

9. The capturing apparatus according to claim 8, wherein the at least one processor is further caused to:
convert the preview image into a black-and-white image;
compare the converted black-and-white image with the one or more pre-stored template images, wherein each of the one or more pre-stored template images has the moiré pattern; and
determine that the moiré pattern exists in the preview image when a similarity between the converted black-and-white image and one of the one or more template images is equal to or greater than the predetermined value.

10. The capturing apparatus according to claim 9, wherein the at least one processor is further caused to:
divide the black-and-white image into a plurality of parts when the preview image is determined to be including the moiré pattern;
compare each part of the plurality of parts with the one or more template images;
determine the moiré pattern exists in one of the plurality of parts when a similarity between the one of the plurality of parts and one of the one or more template images is equal to or greater than the predetermined value.

11. The capturing apparatus according to claim 8, wherein the capturing parameter is a combination of an aperture and a shutter speed of the camera device and/or a focusing distance of the capturing apparatus.

12. The capturing apparatus according to claim 11, wherein an exposure value of the camera device before adjusting the aperture and shutter speed of the camera device is same as the exposure value of the camera device when the aperture and shutter speed of the camera device have been adjusted.

13. The capturing apparatus according to claim 12, wherein the aperture of the camera device is adjusted to be a maximum aperture value of the camera device.

14. The capturing apparatus according to claim 11, wherein the at least one processor is further caused to:
adjust the focusing distance of the camera device by moving a focusing position of the camera device forward or backward with a predetermined value.

15. A non-transitory storage medium having stored thereon instructions that, when executed by a processor of a capturing apparatus, causes the processor to perform an image capturing method, the capturing apparatus comprising a camera device, wherein the method comprises:
obtaining a preview image from the camera device;
comparing the preview image with one or more pre-stored template images;
determining that a moiré pattern exists in the preview image when a similarity between the preview image and one of the one or more pre-stored template images is equal to or greater than a predetermined value;
adjusting a capturing parameter of the camera device when the moiré pattern exists in the preview image; and
controlling the camera device to capture images when the capturing parameter has been adjusted.

16. The non-transitory storage medium according to claim 15, wherein the method further comprises:
converting the preview image into a black-and-white image;
comparing the converted black-and-white image with the one or more pre-stored template images, wherein each of the one or more pre-stored template images has the moiré pattern; and
determining that the moiré pattern exists in the preview image when a similarity between the converted black-and-white image and one of the one or more template images is equal to or greater than the predetermined value.

17. The non-transitory storage medium according to claim 16, wherein the method further comprises:
dividing the black-and-white image into a plurality of parts when the preview image is determined to be including the moiré pattern;
comparing each part of the plurality of parts with the one or more template images;
determining the moiré pattern exists in one of the plurality of parts when a similarity between the one of the plurality of parts and one of the one or more template images is equal to or greater than the predetermined value.

18. The non-transitory storage medium according to claim 15, wherein the capturing parameter is a combination of an aperture and a shutter speed of the camera device and/or a focusing distance of the capturing apparatus.

19. The non-transitory storage medium according to claim 18, wherein an exposure value of the camera device before adjusting the aperture and shutter speed of the camera device is same as the exposure value of the camera device when the aperture and shutter speed of the camera device have been adjusted.

20. The non-transitory storage medium according to claim 19, wherein the aperture of the camera device is adjusted to be a maximum aperture value of the camera device.

* * * * *